United States Patent Office 3,428,652
Patented Feb. 18, 1969

3,428,652
ANGUIDINE DERIVATIVES
Hans-Peter Sigg, Binningen, Erich Flury, Bottmingen, and Daniel Hauser, Arlesheim, Switzerland, assignors to Sandoz Ltd. (also known as Sandoz A.G.), Basel, Switzerland
Filed May 27, 1966, Ser. No. 553,421
Claims priority, application Switzerland, July 2, 1965, 9,330/65
U.S. Cl. 260—326.3
Int. Cl. C07d 7/18; A61k 27/00
3 Claims

ABSTRACT OF THE DISCLOSURE

The compounds are derivatives of anguidine, e.g., betainyl-anguidine-chloride, useful in inhibiting mouse tumor cells.

---

Figure 1:
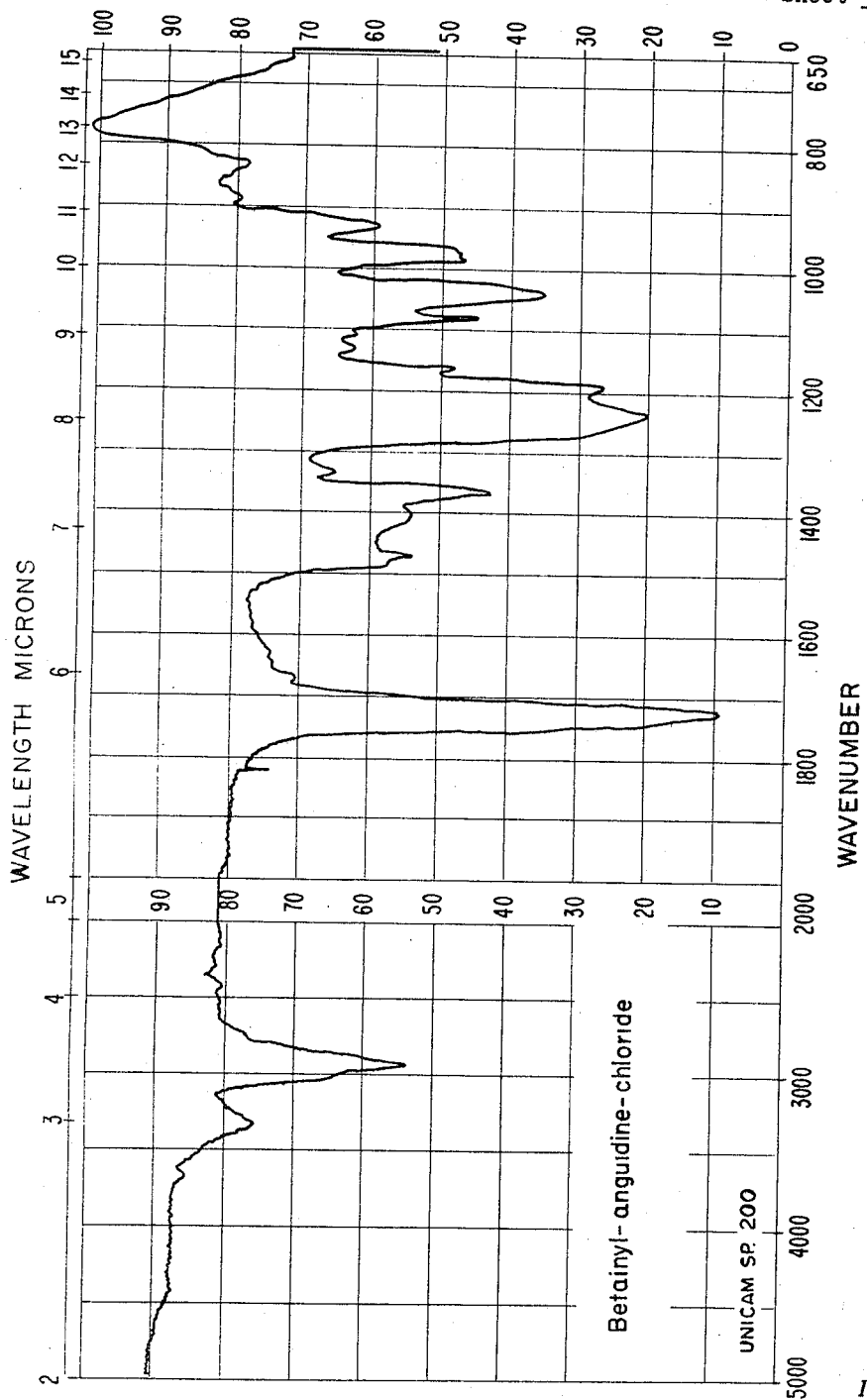

The present invention relates to new heterocyclic compounds and a process for their production.

The present invention provides compounds of general Formula I,

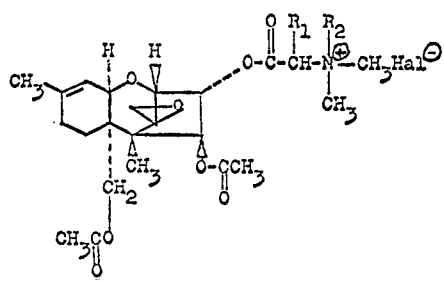

in which
$R_1$ signifies a hydrogen atom, and
$R_2$ signifies a methyl radical, or
$R_1$ and $R_2$ together signify a propylene chain, and
Hal signifies a chlorine, bromine or iodine atom.

The present invention further provides a process for the production of compounds of general Formula I, characterized in that a compound of Formula II,

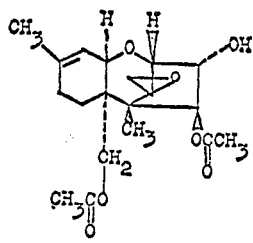

is reacted with a compound of general Formula III,

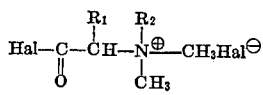

III in which $R_1$, $R_2$ and Hal have the above significance, in the presence of a tertiary amine.

Anguidine (Formula II), also named diacetoxyscirpenol, which is used as starting material in the process of the invention, is known and may, for example, be obtained from culture filtrates of strains of the fungus species Fusarium.

One method of effecting the process of the invention consists in that anguidine is reacted in an inert solvent, e.g. methylene chloride or benzene, with a compound of general Formula III in the presence of a tertiary amine, e.g. pyridine or triethylamine, the mixture is allowed to stand for several hours at room temperature or at a slightly elevated temperature and the resulting compound of general Formula I is isolated in manner known per se and purified, e.g. by crystallization or chromatography.

Compounds I have a strong antimitotic effect, while being readily soluble, so that they are indicated for use in the treatment of tumorous illnesses in animals. This effect was determined by the inhibition of the increase of tumour cells (cells of the mouse mastocytoma P-815). In a suitable nutrient solution these tumour cells increase during 40 hours to 4 to 5 times the initial number. The DE-50 (concentration which inhibits the increase by 50%) of betainyl-anguidine chloride towards these cells is $10^{-8}$ g./ml., the DE-50 of N,N-dimethyl-prolyl-anguidine chloride is $10^{-8}$ g./ml.

Compounds I may be used as pharmaceuticals on their own or in the form of appropriate medicinal preparations for administration, e.g., enterally or parenterally.

A suitable daily dose of compounds I is 0.05 to 5 mg.

In order to produce suitable medicinal preparations the compounds are worked up with organic or inorganic adjuvants which are inert and physiologically acceptable. Examples of such adjuvants are:

| | |
|---|---|
| Tablets and dragées | Lactose, starch, talc and stearic acids. |
| Syrups | Solutions of cane sugar, invert sugar and glucose. |
| Injectable solutions | Water, alcohols, glycerin and vegetable oils. |
| Suppositories | Natural or hardened oils and waxes. |

The preparations may furthermore contain suitable preserving, stabilizing and wetting agents, solubilizers, sweetening and colouring substances and flavourings.

The term "in manner known per se" as utilized herein designates methods in use or described in the literature on the subject.

In the following non-limitative examples all temperatures are indicated in degrees centigrade and are uncorrected.

EXAMPLE 1

Betainyl-anguidine-chloride 360 mg. of anguidine are added to a solution of 284 mg. of betainyl-dichloride in 5 ml. of absolute chloroform and 1 ml. of absolute pyridine and the mixture is allowed to stand in an exsiccator over solid phosphoric acid for 48 hours. 0.5 g. of betainyl-dichloride are subsequently added to the reaction solution. After boiling for a short time and allowing to stand for a further 20 hours, the solution is poured on cold water and shaken out 10 times, each time with 50 ml. of a mixture of chloroform and alcohol (2:1), dried over sodium sulphate and evaporated. The evaporation residue is crystallized from acetone/ether and gives betainyl - anguidine - chloride $C_{24}H_{36}O_8NCl$ having a melting point of 214–215° (decomposition). Infrared spectrum ($CH_2Cl_2$): bands at 1730, 1670, 1230, 970 cm.$^{-1}$ (FIGURE 1).

EXAMPLE 2

Figure 2:
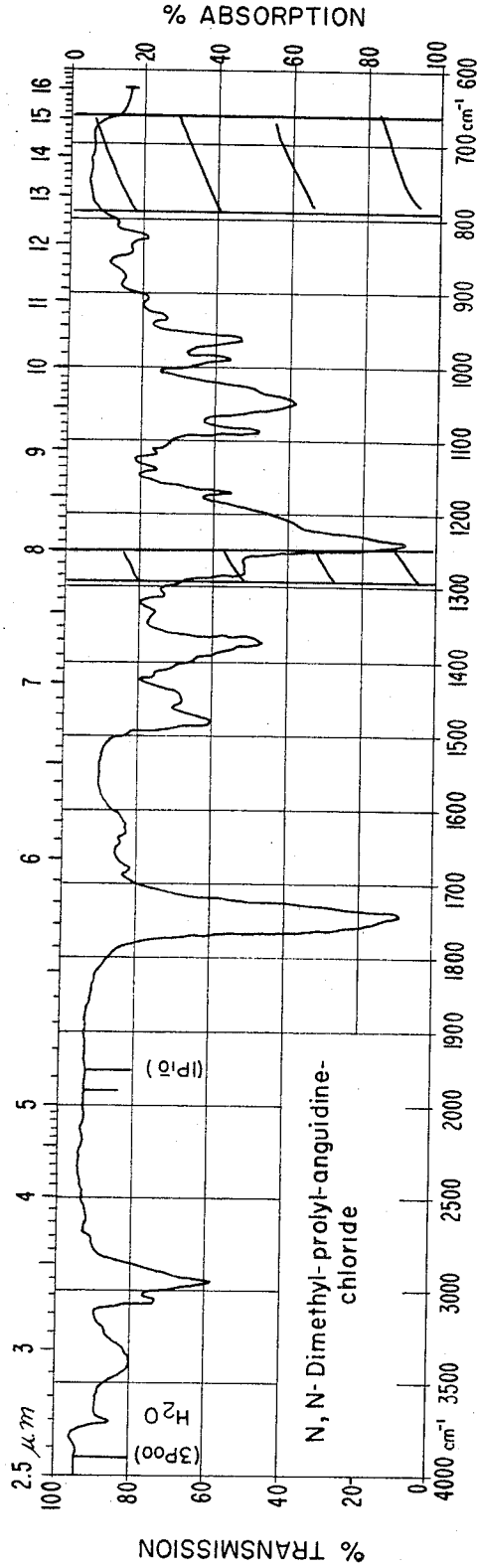

N,N-dimethyl-prolyl-anguidine-chloride 900 mg. of stachydrine hydrochloride are suspended in 1.5 ml. of thionyl chloride, about 5 mg. of aluminium chloride are added thereto and the mixture is kept at 50° for 2 hours. A gas evolution occurs and a homogeneous solution results. The excess thionyl chloride is subsequently distilled off in a vacuum at room temperature. The residue is dried in a high vacuum for 20 hours, is then dissolved in 10 ml. of chloroform and 1 ml. of pyridine and 366 mg. of anguidine are added. The mixture is allowed to stand at room temperature for 48 hours, the reaction mixture is subsequently poured on 10 ml. of water and extracted several times with chloroform/ethanol (2:1). The organic phases are washed twice with water, dried over anhydrous sodium sulphate and reduced in volume. 770 mg. of oily residue are obtained. This is taken up in 20 ml. of water and extracted continuously with methylene chloride for 20 hours. The extract consists of amorphous N,N-dimethyl-prolyl-anguidine-chloride, $C_{26}H_{38}O_8NCl$, which is pure according to thin layer chromatography. Infrared spectrum ($CH_2Cl_2$): bands at 1740, 1675, 1240, 960 cm.$^{-1}$ (FIGURE 2).

What is claimed is:
1. A compound of formula:

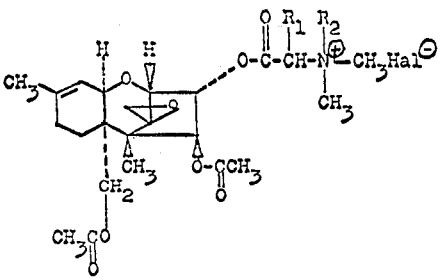

wherein $R_1$ is hydrogen, and
$R_2$ is methyl, or
$R_1$ and $R_2$ together are propylene, and
Hal is chlorine, bromine or iodine.

2. A compound as claimed in claim 1 in which the compound is betainyl-anguidine-chloride.

3. A compound as claimed in claim 1 in which the compound is N,N-dimethyl-prolyl-anguidine-chloride.

References Cited

Dean, "Naturally Occurring Oxygen Ring Compounds," Butterworth Pub., London (1963), pp. 258 and 467.

HENRY R. JILES, *Primary Examiner.*

JOHN M. FORD, *Assistant Examiner.*

U.S. Cl. X.R.

260—345.2, 999